(12) United States Patent  (10) Patent No.: US 8,571,357 B2
Yamakawa  (45) Date of Patent: Oct. 29, 2013

(54) IMAGE DATA MANAGEMENT APPARATUS, METHOD AND PROGRAM

(75) Inventor: Kanako Yamakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 561 days.

(21) Appl. No.: 12/889,966

(22) Filed: Sep. 24, 2010

(65) Prior Publication Data

US 2011/0085696 A1    Apr. 14, 2011

(30) Foreign Application Priority Data

Oct. 8, 2009   (JP) ................................. 2009-234453

(51) Int. Cl.
 *G06K 9/60*   (2006.01)
(52) U.S. Cl.
 USPC ............................ 382/305; 705/319; 707/915
(58) Field of Classification Search
 USPC ........... 382/100, 305, 306; 705/319; 707/626, 707/724, 725, 915, E17.019, E17.026
 See application file for complete search history.

(56) References Cited

U.S. PATENT DOCUMENTS

| 7,714,911 | B2 | 5/2010 | Yoshida ..................... 348/231.5 |
| 2006/0080286 | A1* | 4/2006 | Svendsen ......................... 707/3 |
| 2006/0294096 | A1* | 12/2006 | Kraus et al. ...................... 707/6 |
| 2008/0086511 | A1* | 4/2008 | Takao et al. ................. 707/104.1 |

FOREIGN PATENT DOCUMENTS

JP    2007-325096 A    12/2007

* cited by examiner

*Primary Examiner* — Andrew W Johns
(74) *Attorney, Agent, or Firm* — Fitzpatrick, Cella, Harper & Scinto

(57) ABSTRACT

Image data are each related to identification information on an image-capturing location and an image-capturing apparatus, and a CPU, upon issuance of an image data transfer instruction, determines a non-image-capturing location on the basis of the image-capturing location information for image data captured by a specific image-capturing apparatus and stored in a recording medium. Then, from among image data captured by other image-capturing apparatuses and stored in other recording medium, image data captured in the non-image-capturing location is extracted, so that a user of the specific image-capturing apparatus can easily obtain image data captured by the other apparatuses in a location that the specific image-capturing apparatus did not capture images of.

11 Claims, 15 Drawing Sheets

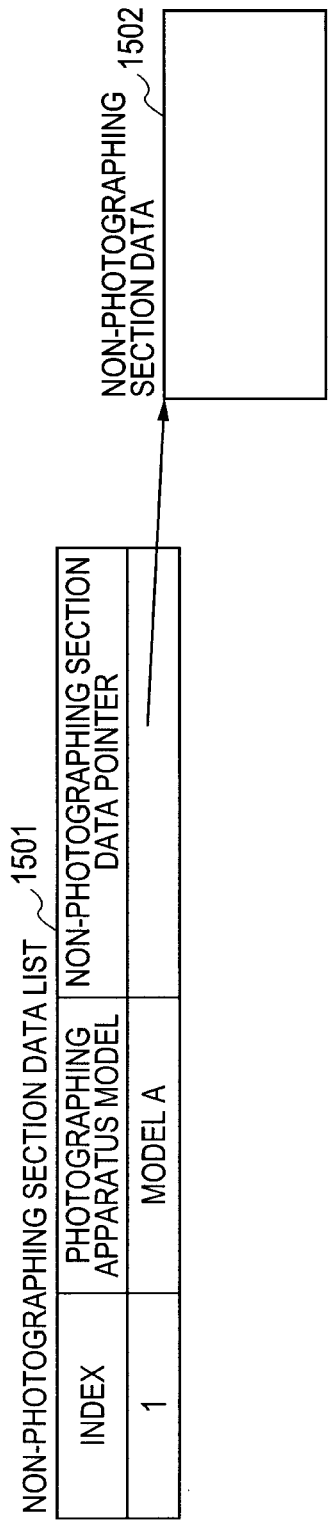

IMAGE DATA MANAGEMENT APPARATUS, METHOD AND PROGRAM

BACKGROUND OF THE INVENTION

1. Field of the Invention

The present invention relates to an image data management apparatus, method, program and computer-readable storage medium for managing image data captured by a plurality of image-capturing apparatuses.

2. Description of the Related Art

The advent of data holding media with large-capacity memory and the proliferation of Web systems have increased the opportunities for individuals to manage a large amount of image data. Also, image-capturing apparatuses such as digital cameras and digital video cameras are becoming smaller and lighter, and because of the portability of such apparatuses, the idea of one camera for each person is spreading. Therefore, people have more occasions to exchange or manage image data captured by their respective image-capturing apparatuses.

For example, if persons visit different tourist spots in their free time in a group tour, they may wish to obtain images of places where they did not take images. In those cases, one may later obtain image data for the places and scenes where he/she did not take images from image data captured by other image-capturing apparatus.

However, in conventional methods, a user needs to manually check image data one by one to obtain appropriate ones, forcing the user to bear a large burden when managing a great amount of image data.

SUMMARY OF THE INVENTION

In view of the above-described related art, it is an aspect of the present invention to attain that a user can easily extract image data of a location where the user did not take images but another user did.

According to an aspect of the invention, an image data management apparatus of the present invention, which manages a plurality of image data each of which is stored in relation to identification information unique to an image-capturing apparatus and image-capturing location information indicating an image-capturing location, comprises: a determination unit configured to determine a non-image-capturing location for an image-capturing apparatus corresponding to specific identification information on the basis of the image-capturing location information of image data related to the specific identification information; and an extraction unit configured to extract, from among image data related to other identification information that is different from the specific identification information, image data whose image-capturing locations exists in the non-image-capturing location.

According to the features of the present invention described above, it can be attained to easily extract image data captured by another person at somewhere at which a user did not take images.

Further features of the present invention will become apparent from the following description of exemplary embodiments with reference to the attached drawings.

BRIEF DESCRIPTION OF THE DRAWINGS

FIG. 15 is a diagram illustrating a non-image-capturing section data list and non-image-capturing section data, which are handled by an image data management apparatus according to a third embodiment.

DESCRIPTION OF THE EMBODIMENTS

Preferred embodiments of the present invention will now be described in detail in accordance with the accompanying drawings.

Hereinafter, exemplary embodiments of the invention will be described with reference to the attached drawings. In the following embodiments, a configuration and operation of the present invention will be described taking a personal computer (PC) as an example of an image data management apparatus having a function that manages image data held on a hard disk and image data held on external recording apparatuses.

First Embodiment

Hardware Configuration

Figure 1:
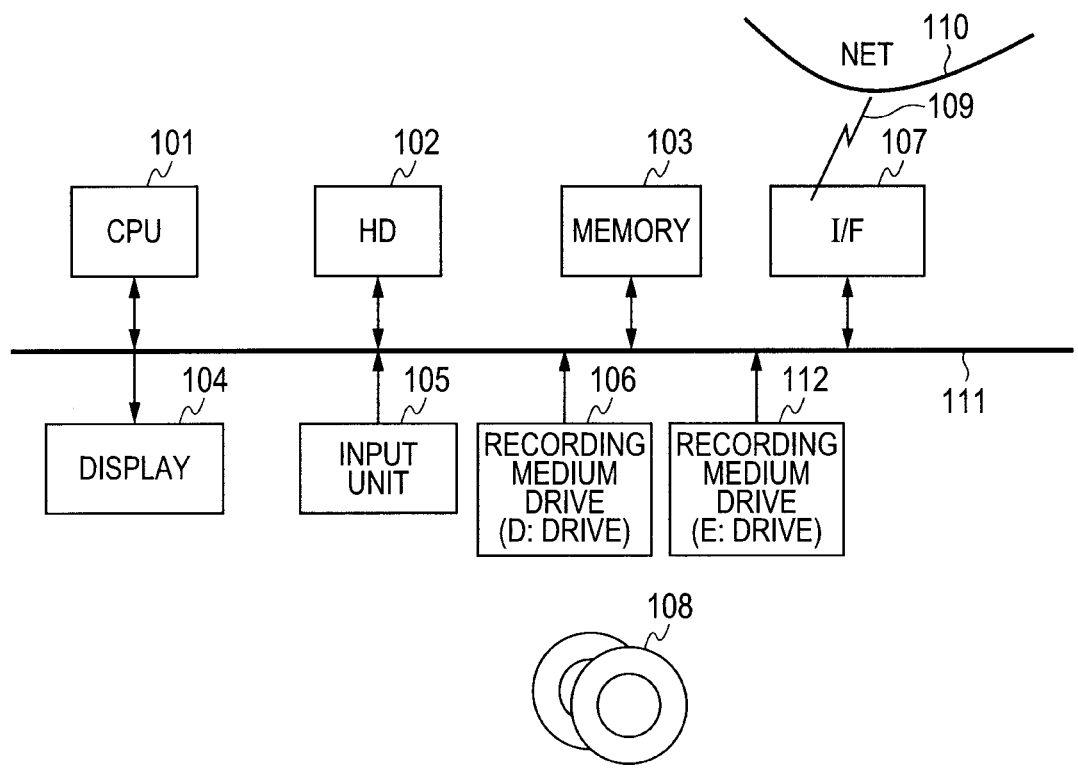
FIG. 1 is a block diagram illustrating a configuration of a personal computer that functions as an image data management apparatus according to a first embodiment.

FIG. 1 is a block diagram illustrating a configuration of a PC that functions as an image data management apparatus according to the present embodiment. A processing unit (CPU) 101 controls the operation of the image data management apparatus. A hard disk (HD) 102 records digital data such as programs and image data. An image data management program is recorded in the HD 102 as computer-readable program code, and the CPU 101 executes the program code.

A main memory 103 is used as a work area for the CPU 101. A display 104 displays characters and images. An input unit 105 includes a keyboard and/or a mouse. The input unit 105 may be an available input device other than a keyboard and/or a mouse. Using the input unit 105, a user can execute the image data management program.

Recording medium drives 106 and 112 are devices that read data stored on external recording media 108, such as CD-ROMs, DVD-ROMs or memory cards, or write data to the external recording media. In the present embodiment, the external recording media 108 are memory cards, and two recording medium drives, a D: drive 106 and an E: drive 112 are provided. The present invention can be applicable to the case where the number of recording medium drives is larger or smaller than the aforementioned number. The present invention can also be applicable to the case where the external recording media 108 are available external recording media other than memory cards such as CD-ROMs or DVD-ROMs. Also, although the present embodiment is described in terms of an example in which a program is recorded in the HD 102, a configuration in which a program is recorded in the external recording media 108 and the CPU 101 executes the program via the D: drive 106 and the E: drive 112 may be employed.

A network interface 107 is connected to a network 110 via a communication line 109. The present invention is applicable to the case where a recording medium is present in the network 110 and a program is executed on the recording medium or where image data to be subjected to processing (processing object data) is held on a recording medium on the network 110. An internal bus 111 is provided to connect the aforementioned components.

Image Data Configuration

A configuration of still image data, which is processing object image data for an image data management apparatus according to the present embodiment, will be described. Still image data includes three types of information: image-capturing information for storing information on image-capturing, reduced image information for storing reduced image data, and image information for storing original image data. For the image-capturing information, an image-capturing location, image-capturing date and time, an image-capturing direction and/or an image-capturing apparatus model name are related to image data. The image-capturing apparatus model name is the type or serial number of an image-capturing apparatus, which can be used for uniquely identifying the image-capturing apparatus. The image-capturing information may be managed in a file separate from a file in which image information is stored, and stored in relation to the image information. Although the present embodiment is described in terms of still image data, the present invention is also applicable to video data in the similar manner.

Overview of Operation of Image Transfer Processing

Figure 2:
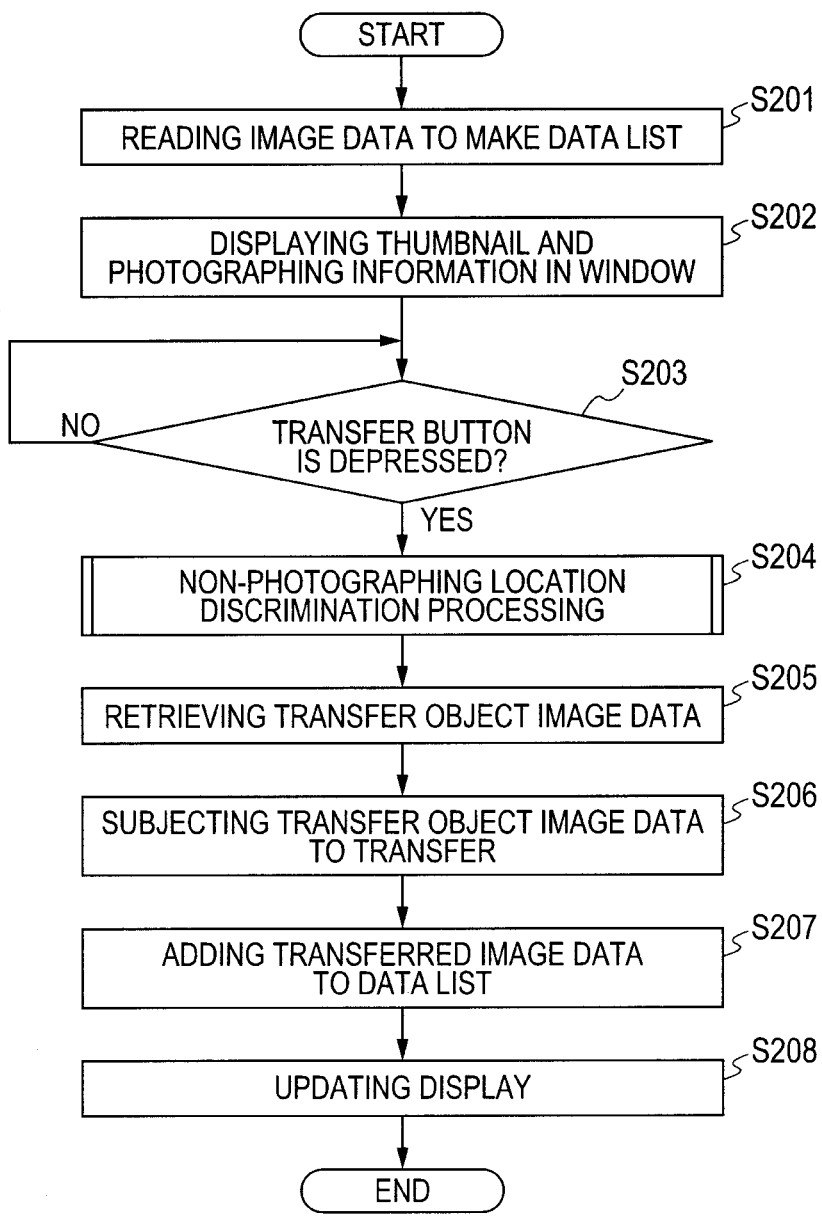
FIG. 2 is a flowchart illustrating an overview of operation of an image data management apparatus according to a first embodiment.
Figure 3:
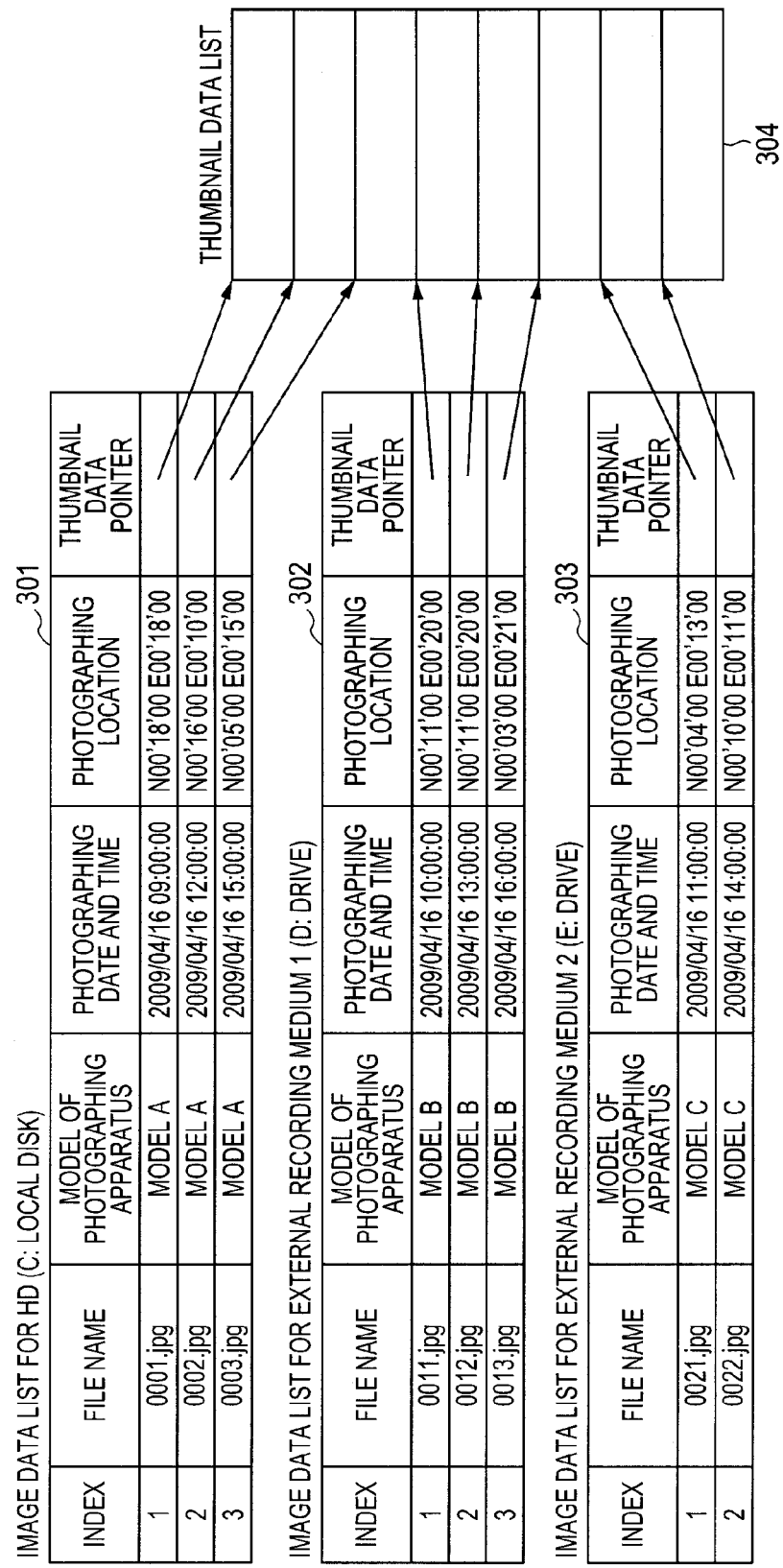
FIG. 3 is a diagram illustrating image data lists and a thumbnail data list, which are handled before an image data transfer by an image data management apparatus according to a first embodiment.

An overview of operation of an image data management apparatus according to the present embodiment will be described. FIG. 2 is a flowchart illustrating an overview of operation of an image data management apparatus according to the first embodiment. First, the CPU 101, upon invocation of an image data management program, advances the process to step S201. In step S201, the CPU 101 reads image data to be used in the image data management apparatus from the HD 102 and the external recording media 108, and makes image data lists 301 to 303 and a thumbnail data list 304, which are illustrated in FIG. 3, and stores the image data lists 301 to 303 and the thumbnail data list 304 in the memory 103. The image data lists 301 to 303 and the thumbnail data list 304 are used for screen display and data management in the image data management apparatus.

The image data lists 301 to 303 each include six categories: index, file name, image-capturing apparatus model name, image-capturing date and time, image-capturing location, and thumbnail data pointer. The image data list 301 is a list of image data stored in the HD 102. The image data lists 302 and 303 are lists of image data that can be read from the external recording media 108 via the D: drive 106 and the E: drive 112, respectively. In each of the image data lists 301 to 303, the image data are sorted in chronological order based on the image-capturing date and time information. Thumbnails stored in the thumbnail data list 304 are reduced image information of the still image data.

Figure 4:
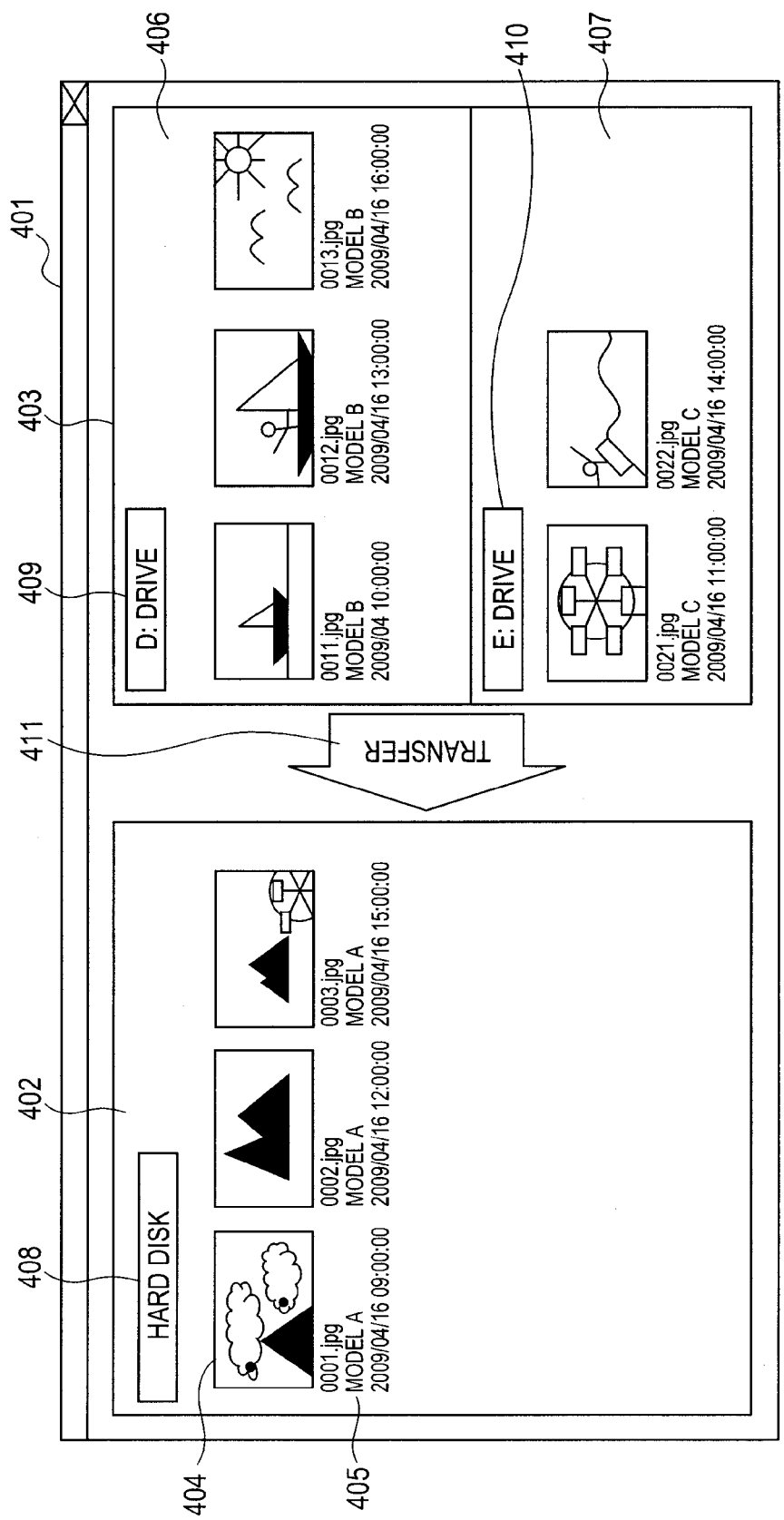
FIG. 4 is a diagram illustrating a display window displayed before an image data transfer on an image data management apparatus according to a first embodiment.

In step S202, the CPU 101 displays a window 401, which is illustrated in FIG. 4, in the display 104. The CPU 101 displays image-capturing information 404 in the image data lists 301 to 303 and thumbnails 405 in the thumbnail data list 304 in the window 401. In the present embodiment, the CPU 101 displays file names, image-capturing apparatus model names, image-capturing dates and times, and image-capturing locations (latitudes and longitudes), which have been obtained from the image data, in the window 401 as the image-capturing information 404. The CPU 101 displays image data in the image data list 301 in the HD 102 in a left area 402 of the window 401. Also, the CPU 101 displays image data in the image data lists 302 and 303 in an area 406 of the D: drive 106 and an area 407 of the E: drive 112 in a right area 403 of the window 401, respectively. The CPU 101 displays recording medium drive names 408, 409 and 410 in the window 401 so that it can be recognized which recording medium each area corresponds to. Also, a transfer button 411 is displayed between the area 402 and the area 403.

In step S203, the CPU 101 determines whether or not an image data transfer instruction is issued, that is, where or not the transfer button 411 in the window 401 is depressed. If the transfer button 411 has been depressed (step S203: YES), the CPU 101 advances the process to step S204.

In step S204, the CPU 101 determines non-image-capturing locations for a model A based on the image-capturing location information of the image data in the HD 102. Then, the CPU 101 extracts image data captured in the non-image-capturing locations of the model A from among the image data in the D: drive 106 and the E: drive 112. The details of this processing will be described later. For example, in the image data lists 301 to 303 in FIG. 3, "0011.jpg," "0012.jpg" and "0013.jpg" in the D: drive 106 and "0022.jpg" in the E: drive 112 are extracted.

In step S205, the CPU 101 further performs retrieval based on other image-capturing information from the image data in the D: drive 106 and the E: drive 112, which have been extracted in step S204 as image data captured in the non-image-capturing locations for the model A.

For example, using image-capturing time as the other image-capturing information, image data having image-capturing times in the same time period as that of the image data captured by the model A are extracted. More specifically, the CPU 101 obtains the image-capturing dates and times of the image data of the model A in the HD 102 to obtain the earliest image-capturing date and time and the latest image-capturing date and time. Then, from among the image data retrieved in step S204, the image data having image-capturing times between the earliest and latest image-capturing date and times of the model A are retrieved as image data to be subjected to transfer (transfer object image data). With reference to the image data list 301, the earliest image-capturing date and time and the latest image-capturing date and time in the image data in the HD 102 are 2009/04/16 09:00 and 2009/04/16 15:00, respectively. From among the image data in the D: drive 106 and the E: drive 112, only "0013.jpg" in the D: drive 106 falls outside the range from the earliest to latest image-capturing date and times of the model A, and thus is not extracted in step S205. Consequently, images taken by another user accompanying a user of the image-capturing apparatus of the model A can be retrieved.

In step S206, the CPU 101 copies image data retrieved as transfer object image data in the processing up to step S205, in the HD 102. In the present embodiment, "0011.jpg" and "0012.jpg" in the D: drive 106 and the "0022.jpg" in the E: drive 112 are transfer object image data. Here, "image-capturing apparatus model name+original file name" is used for the file name of the copy. If there are the same file names, consecutive number different from the same file name is provided as the file name of the file to be copied later.

Figure 5:
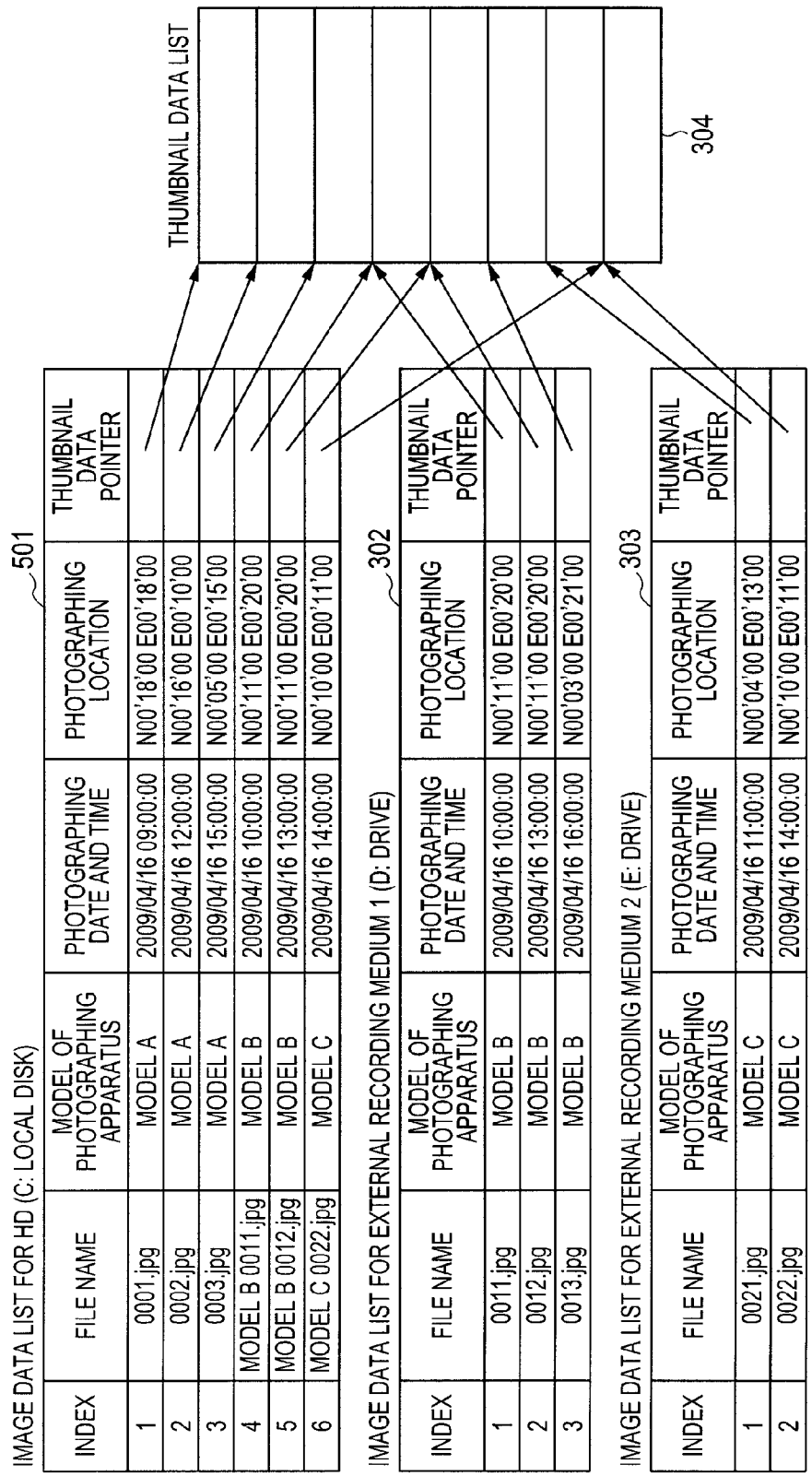
FIG. 5 is a diagram illustrating image data lists and a thumbnail data list, which are handled after an image data transfer by an image data management apparatus according to a first embodiment.

In step S207, the CPU 101 stores information on the image data transferred to the HD 102 in step S206 by adding the information to the image data list 301. FIG. 5 illustrates an image data list 501, to which the information has been added, in the first embodiment.

Figure 6:
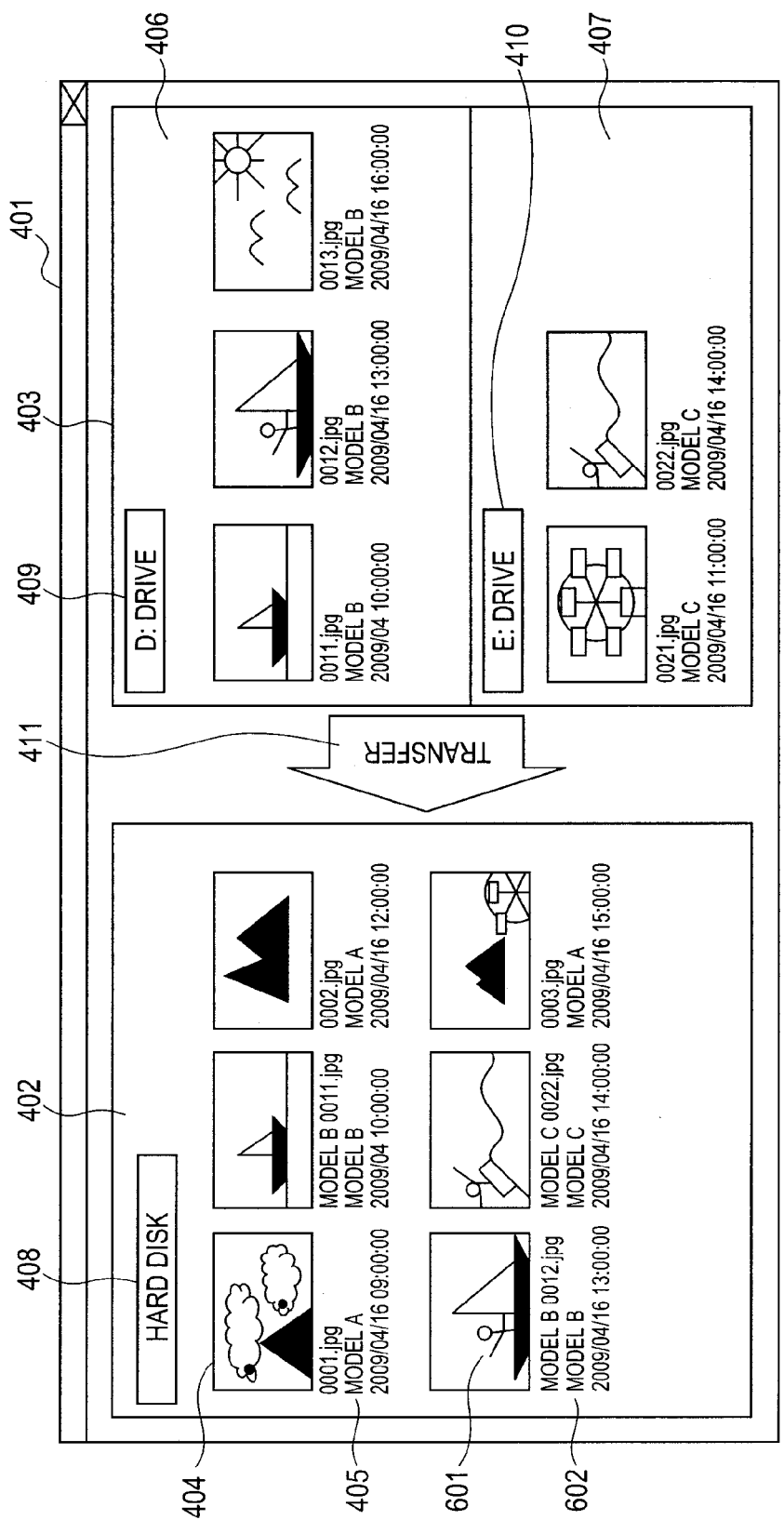
FIG. 6 is a display window displayed after an image data transfer on an image data management apparatus according to a first embodiment.

In step S208, the CPU 101 displays thumbnails 601 and image-capturing information 602 of the transfer object image data in the area 402 of the window 401 as illustrated in FIG. 6, based on the image data list 501 updated in step S207.

Non-Image-Capturing Location Determination Processing

Figure 7:
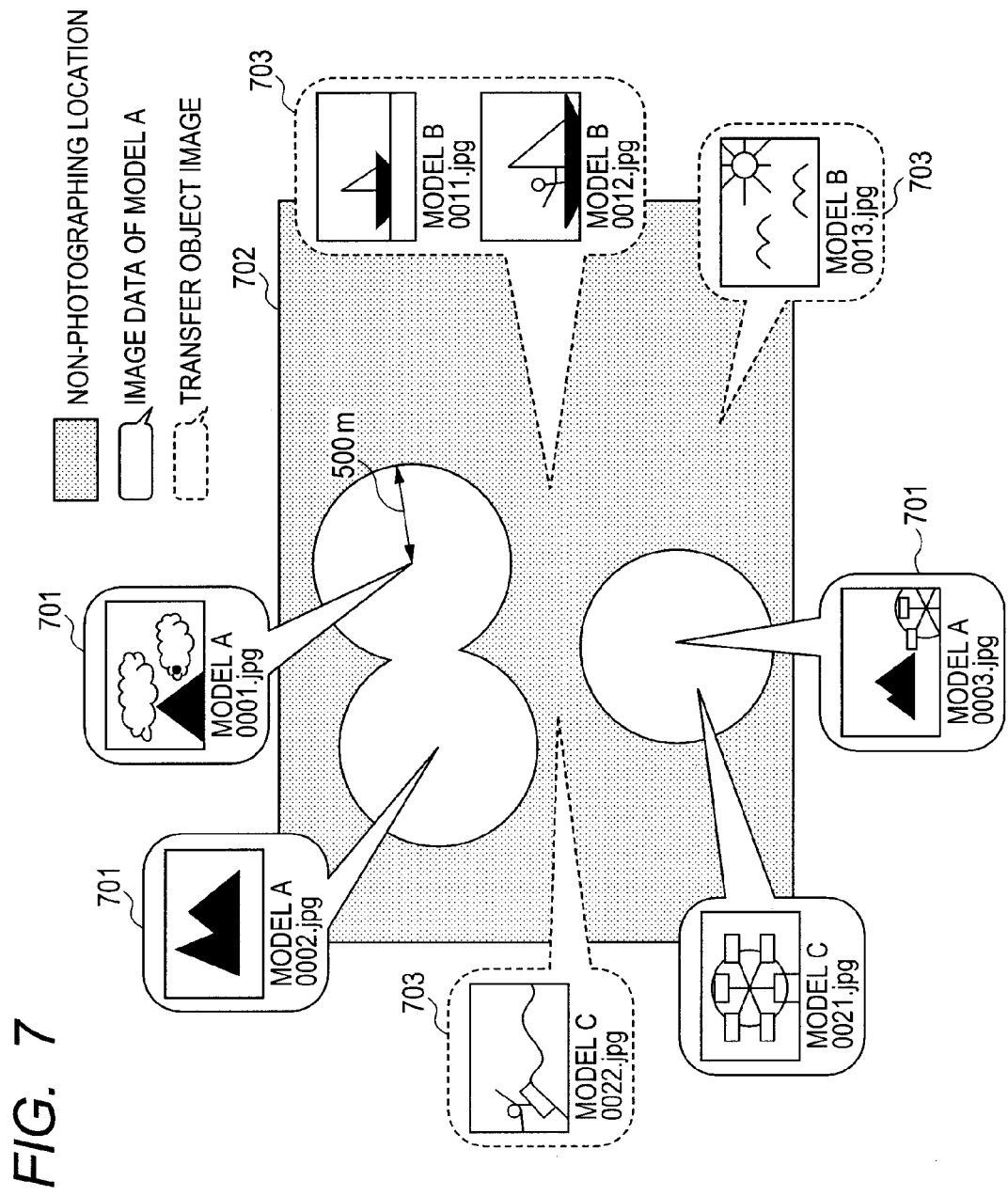
FIG. 7 is a diagram illustrating non-image-capturing location determination processing in an image data management apparatus according to a first embodiment.
Figure 8:
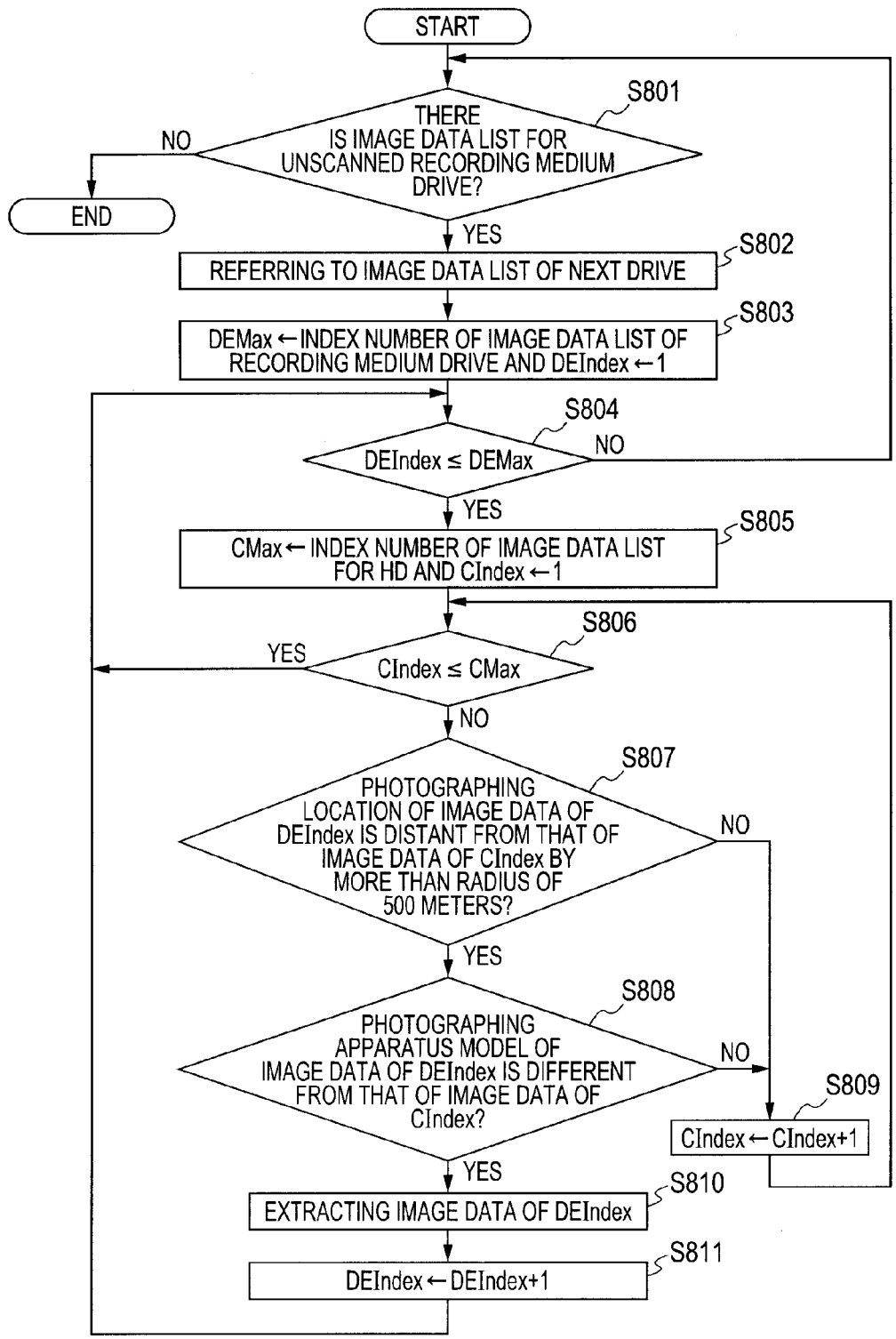
FIG. 8 is a flowchart illustrating non-image-capturing location determination processing in an image data management apparatus according to a first embodiment.

Next, the details of non-image-capturing location determination processing in step S204 in FIG. 2 will be described using the map in FIG. 7 and the flowchart in FIG. 8. FIG. 7 illustrates an example of indicating image-capturing location information of each image data on a map. The content, image-capturing apparatus model name and file name of image data are indicated in each balloon, and the destinations that the balloons point to indicate the image-capturing locations of the respective image data. Heavy-line balloons 701 indicate image data whose image-capturing apparatus model names are the model A. Locations no less than a predetermined distance away from the destinations that the balloons designate are determined to be non-image-capturing locations for the model A. In the present embodiment, it is assumed that the predetermined distance is a radius of 500 meters. The image data captured in the non-image-capturing locations and having image-capturing apparatus model names other than the model A (image data in dotted-line balloons 703) are extracted. In the present embodiment, the retrieval object range is not specifically provided and all the image data in the D: drive 106 and the E: drive 112 are retrieval objects. However, a given range may be set to a retrieval object range 702 on the map to determine only image data whose image-capturing location is in the given range, to be retrieval objects.

The above-described processing will be described using the flowchart in FIG. 8. In step S801, the CPU 101 determines whether or not there is an image data list for an unscanned recording medium drive. If there is an unscanned image data list (step S801: YES), the CPU 101 advances the process to step S802. If there is not (step S801: NO), the CPU 101 terminates non-image-capturing location determination processing.

In step S802, the CPU 101 refers to the unscanned image data list. In step S803, the CPU 101 stores the number of indexes in the image data list for the recording medium drive in DEMax, and 1 in DEIndex indicating a reference index value, respectively.

In step S804, the CPU 101 determines whether or not DEIndex is not more than DEMax. If DEIndex is not more than DEMax (step S804: YES), the CPU 101 advances the process to step S805. If it is not, the CPU 101 terminates the reference of the recording medium drive that the CPU 101 is currently scanning, and advances the process to step S801.

In step S805, the CPU 101 stores the number of indexes in the image data list in the HD 102 in CMax, and 1 (initial value) in CIndex indicating a reference index value, respectively. In step S806, the CPU 101 determines whether or not CIndex is no more than CMax. If CIndex is no more than CMax (step S806: YES), the CPU 101 advances the process to step S807. If it is not (step S806: NO), the CPU 101 advances the process to step S804.

In step S807, the CPU 101 determines whether or not the image-capturing location of the image data indicated by DEIndex is a radius of no less than 500 m away from the image-capturing location of the image data indicated by CIndex. If the image-capturing location is a radius of no less than 500 m away (step S807: YES), the CPU 101 advances the process to step S809. If it is not (step S807: NO), the CPU 101 advances the process to step S808. Here, a location where the image-capturing location of the image data indicated by DEIndex has a distance of a radius of no less than 500 m from the image-capturing location of the image data indicated by CIndex is a non-image-capturing location, and conversely, a location having a distance of a radius of less than 500 m falls within the image-capturing range.

In step S808, the CPU 101 determines whether or not the image-capturing apparatus model name of the image data indicated by DEIndex is different from the image-capturing apparatus model name of the image data indicated by CIndex. If the image-capturing apparatus model name is different (step S808: YES), the CPU 101 advances the process to step S810. If it is not (step S808: NO), the CPU 101 advances the process to step S809.

In step S809, the CPU 101 increments the value of CIndex by one.

In step S810, the CPU 101 stores the image data indicated by DEIndex as the extraction result. In step S811, the CPU 101 increments DEIndex by one. The above is the operation flow of the non-image-capturing location determination processing.

In the present embodiment, the image data management apparatus determines a location having a distance of no less than a predetermined value from the image-capturing location of image data captured by a specific image-capturing apparatus, to be a non-image-capturing location. However, the present invention is not limited to the above example, and the retrieval object area may be divided into a plurality of small areas, determining a small area not having image data captured by a specific image-capturing apparatus to be a non-image-capturing location.

Furthermore, although the present embodiment has been described in terms of the case where a non-image-capturing location is determined, instead, a location having a distance within a predetermined value from the image-capturing location of image data captured by a specific image-capturing apparatus may be determined to be an image-captured location. In this case, image data captured by another image-capturing apparatus for an image-capturing location not included in the image-captured location may be extracted.

The present invention is also applicable to image data sharing apparatuses using on-line albums and inter-camera communication. A specific example will be described. First, an image data management apparatus accesses an information provision apparatus having a Web server function that provides an on-line album service, via a network. Then, the image data management apparatus obtains image data lists indicating image data belonging to album folders managed in the information provision apparatus, and displays the data list in a window. The window displays thumbnails of image data in an image data list in the HD 102 in the image data management apparatus like in FIG. 4, and instead of the recording medium, displays the thumbnails of the image data in the image data lists by album folder. Then, the image data management apparatus, upon issuance of an image data transfer instruction, determines non-image-capturing locations for the model A, extracts image data captured in the same time period as that of the model A for the non-image-capturing locations from the image data lists, and demands downloading of the image data from the server apparatus. The image data management apparatus receives the image data from the server apparatus and stores the image data in the HD 102, and stores information on the image data by adding the information to the image data list.

Furthermore, the present invention is applicable not only to still image data, but also to video data in a similar manner. Video data is extracted as transfer object image data if the image-capturing location of the video data at least partially overlaps with a non-image-capturing location and was captured in the time period at least partially overlapping with that of the model A.

The above is an overview of operation of an image data management apparatus according to the present embodiment. In the present embodiment, image-capturing apparatus model names are used for non-image-capturing location determination and transfer object image data extraction, enabling easy extraction of image data for locations where a specific image-capturing apparatus did not capture images but another image-capturing apparatus did.

Furthermore, in the present embodiment, data of images taken by another user in the time period in which a user took images are determined to be as transfer object image data, enabling easier obtainment of image data in the time period that the user wished to take images.

Second Embodiment

A PC that functions as an image data management apparatus according to a second embodiment, and still image data, which is processing object image data, each have a configuration similar to that in the first embodiment and thus has been described above.

Overview of Operation of the Entire Program

In the above-described first embodiment, a location no less than a certain distance away from an image-capturing location where a specific image-capturing apparatus took images is determined to be a non-image-capturing location. Meanwhile, in the second embodiment, a location having a distance of no less than a predetermined value from a movement route of an image-capturing apparatus is determined to be a non-image-capturing location.

Furthermore, although in the first embodiment, transfer object image data have been further extracted from image data of the non-image-capturing locations based on the image-capturing dates and times, in the second embodiment, image data whose image-capturing locations are close to a movement route of a specific image-capturing apparatus are further extracted as transfer object image data.

The second embodiment is different from the first embodiment in details of operation in non-image-capturing location determination processing (flowchart in FIG. 2: step S204) and transfer object image data retrieval processing (flowchart in FIG. 2: step S205). The details of the respective processing will be described later. The second embodiment will be described using the image data lists 301, 302 and 303 and the thumbnail data list 304 in FIG. 3 as in the first embodiment.

Non-Image-Capturing Location Determination Processing

Figure 9:
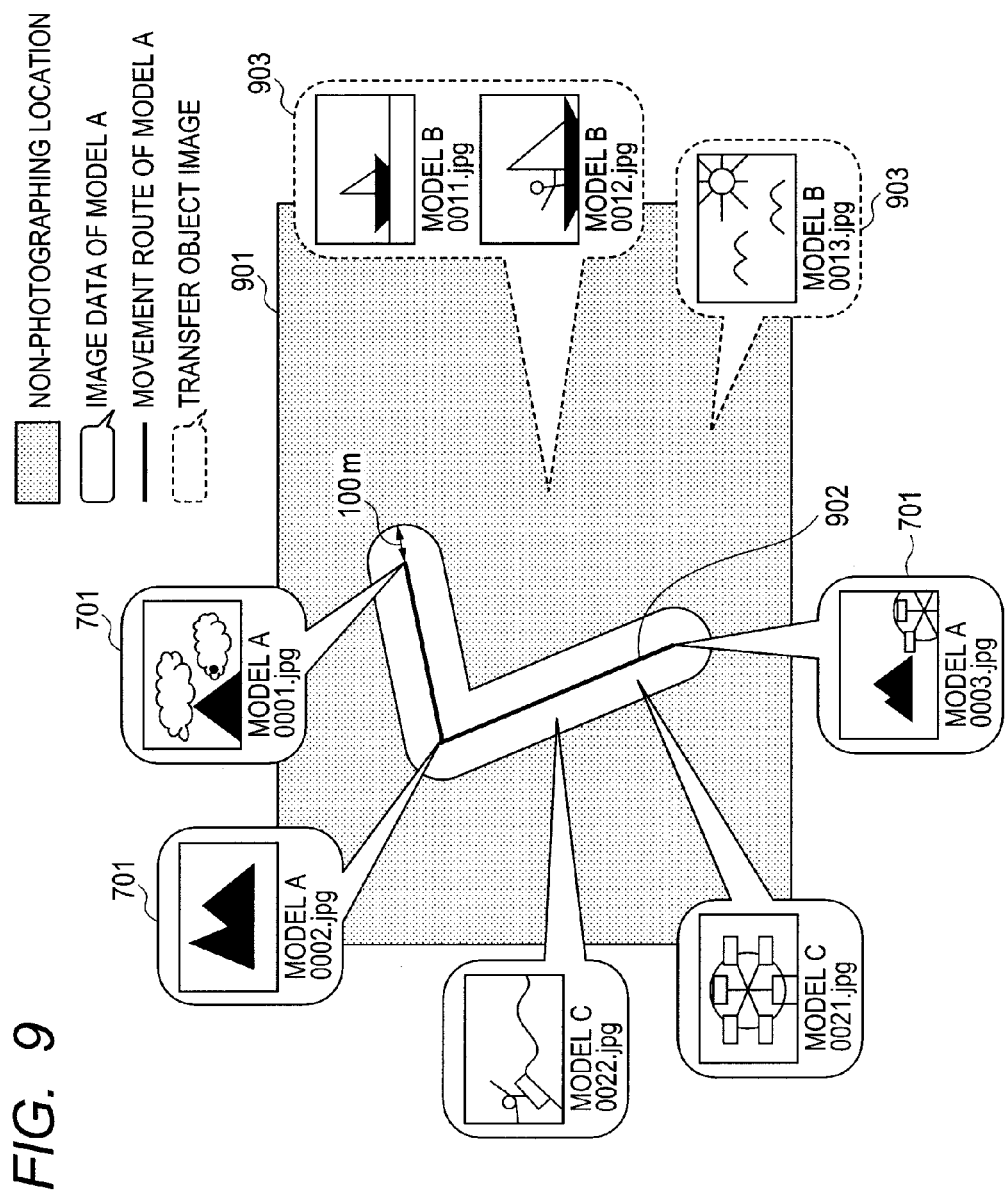
FIG. 9 is a diagram illustrating non-image-capturing location determination processing in an image data management apparatus according to a second embodiment.
Figure 10:
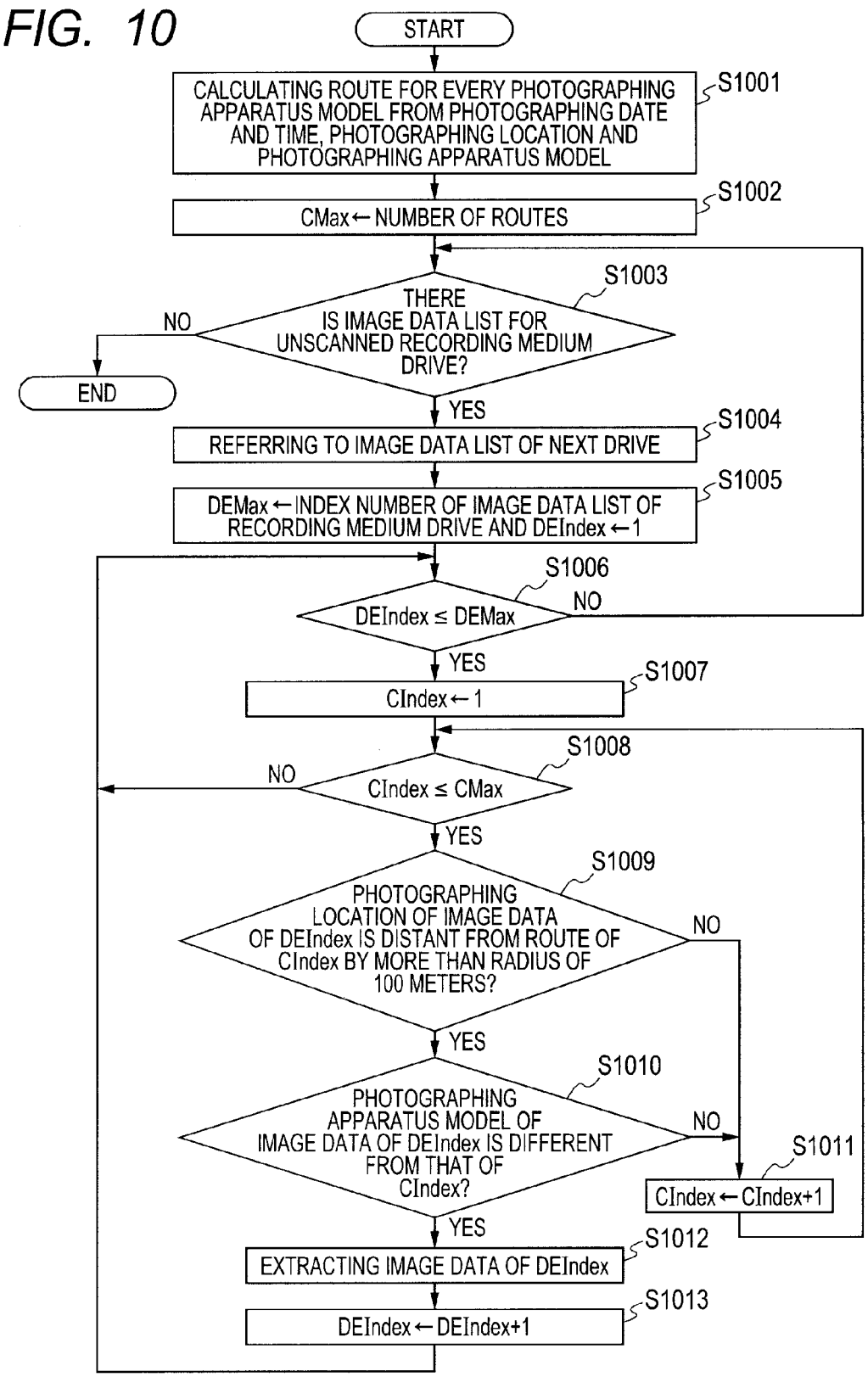
FIG. 10 is a flowchart illustrating non-image-capturing location determination processing in an image data management apparatus according to a second embodiment.

Next, the details of non-image-capturing location determination processing in step S204 in FIG. 2 will be described using the map in FIG. 9 and the flowchart in FIG. 10. FIG. 9 illustrates an example of indicating image-capturing location information of each image data in a map. The content, image-capturing apparatus model name and file name of image data are indicated in each balloon, and the destinations that the balloons designate indicate the image-capturing locations of the respective image data. Bold line balloons 701 indicate image data whose image-capturing apparatus model names are a model A. A straight line connecting the image-capturing locations of image data captured by the model A (the positions which the heavy-line balloons 701 point to) according to the time series of the image-capturing dates and times of the image data is a movement route 902 of the model A. Locations no less than a predetermined distance away from the movement route 902 of the model A are determined to be non-image-capturing locations for the model A. In the present embodiment, it is assumed that the predetermined distance is a radius of 100 meters. The image data captured in the non-image-capturing locations and having image-capturing apparatus model names that are not the model A (image data in dotted-line balloons 903) are extracted. In the present embodiment, a retrieval object range is not specifically provided, and all the image data in the D: drive 106 and the E: drive 112 are retrieval objects. However, a given range may be set to a retrieval object range 901 on the map to determine only image data captured in image-capturing locations within the given range, to be retrieval objects. Also, only image data having image-capturing information related to the image data (for example, image-capturing dates and times) satisfying a predetermined condition may be determined to be retrieval objects.

Figure 11:
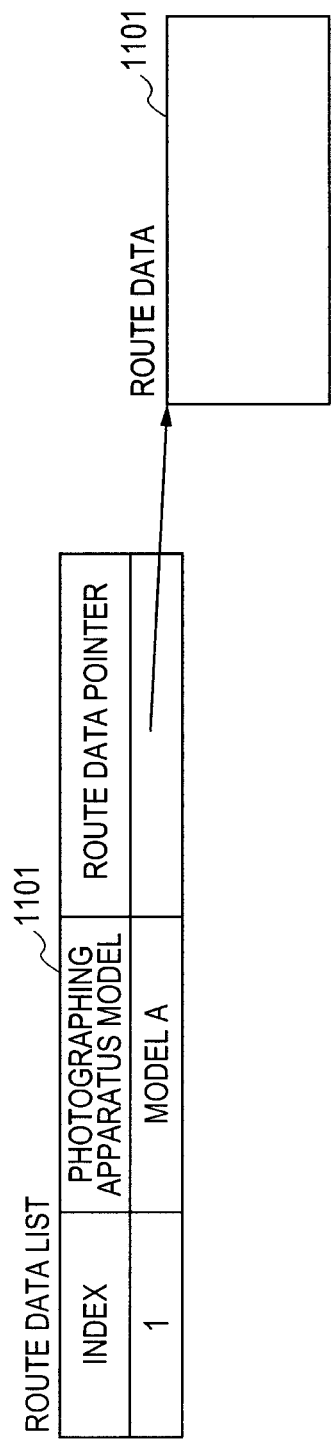
FIG. 11 is a diagram illustrating a route data list and route data, which are handled by an image data management apparatus according to a second embodiment.

The aforementioned processing will be described using the flowchart in FIG. 10. In step S1001, a CPU 101 makes a route data list 1101 and route data 1102 as illustrated in FIG. 11 from the image-capturing dates and times, image-capturing locations and image-capturing apparatus model names in an image data list 301 in an HD 102 for each image-capturing apparatus model name. The route data list 1101 includes index, image-capturing apparatus model name and route data pointer. The CPU 101 sorts image data according to the image-capturing dates and times thereof for each image-capturing apparatus model name, and records information of a line connecting the image-capturing locations corresponding respectively to the sorted image data, as the route data 1102.

In step S1002, the CPU 101 stores the number of routes calculated in step S1001 (the number of route data lists 1101) in CMax. In step S1003, the CPU 101 determines whether or not there is an image data list in an unscanned recording medium drive. If there is an unscanned image data list (step S1003: YES), the CPU 101 advances the process to step S1004. If there is not (step S1003: NO), the CPU 101 terminates the non-image-capturing location determination processing.

In step S1004, the CPU 101 refers to the image data list for the unscanned recording medium drive. In step S1005, the CPU 101 stores the number of indexes in the image data list for the recording medium drive that is being scanned in DEMax, and stores 1 (initial value) in DEIndex indicating a referred index value.

In step S1006, the CPU 101 determines whether or not the DEIndex is not more than DEMax. If the DEIndex is not more than DEMax (step S1006: YES), the CPU 101 advances the process to step S1007. If it is not (step S1006: NO), the CPU 101 advances the process to step S1003.

In step S1007, the CPU 101 stores 1 (initial value) in CIndex indicating a referred index value. In step S1008, the CPU 101 determines whether or not CIndex is not more than CMax. If CIndex is not more than CMax (step S1008: YES), the CPU 101 advances the process to step S1009. If it is not (S1008: NO), the CPU 101 advances the process to step S1006.

In step S1009, the CPU 101 determines whether or not the image-capturing location of the image data indicated by DEIndex is a radius of no less than 100 meters away from the route data 1102 indicated by CIndex. If the image-capturing location is a radius of no less than 100 meters away (step S1009: YES), the CPU 101 advances the process to step S1010. If it is not (step S1009: NO), the CPU 101 advances the process to step S1011. Here, a location where the image-capturing location of the image data indicated by DEIndex has a distance of a radius of no less than 100 meters from the route data 1102 indicated by CIndex is a non-image-capturing location, and conversely, a location where the image-capturing location has a distance of a radius of less than 100 meters falls within the image-capturing range.

In step S1010, the CPU 101 determines whether or not the image-capturing apparatus model name of the image data indicated by DEIndex is different from the image-capturing apparatus model name indicated by CIndex. If it is different (step S1010: YES), the CPU 101 advances the process to step S1012. If it is not (step S1010: NO), the CPU 101 advances the process to step S1011.

In step S1011, the CPU 101 increments the value of CIndex by one.

In step S1012, the CPU 101 stores the image data indicated by DEIndex as the extraction result. In step S1013, the CPU 101 increments the value of DEIndex by one. The above is the operation flow of the non-image-capturing location determination processing. Using image data lists 301, 302 and 303 in FIG. 3, the transfer object image data in the above-described non-image-capturing location determination processing are "0011.jpg," "0012.jpg" and "0023.jpg" in the D: drive 106.

Transfer Object Image Data Retrieval Processing

Next, the retrieval processing in step S205 will be described. In the retrieval processing in the present embodiment, if there is a plurality of image data whose image-capturing locations are close to each other among the image data extracted in step S204, the CPU 101 further selects image data based on the image-capturing apparatus model names, and retrieves the image data as transfer object image data. More specifically, the CPU 101 calculates the distances of the image-capturing locations of the plurality of the image data extracted in step S204, and if there are image data captured within a certain range (for example, 100 m), the CPU 101 obtains their respective image-capturing apparatus model names. Then, the CPU 101 selects image data having an image-capturing apparatus model name of the highest priority, and determines the image data to be transfer object image data. The priority is set in advance for each image-capturing apparatus model name, and an image-capturing apparatus with higher-level specifications (such as the capability of capturing high-resolution image data) may be provided with a higher priority, or a user may designate the priority order.

Although the present embodiment has been described in terms of the case where a non-image-capturing location is determined, instead, a location having a distance within a predetermined value from the movement route of a specific image-capturing apparatus may be determined to be an image-captured location. In this case, image data captured by another image-capturing apparatus for an image-capturing location not included in the image-captured location may be extracted.

In the present embodiment, the movement route of a specific image-capturing apparatus is used for non-image-capturing location determination, enabling easy extraction of image data for locations where a specific image-capturing apparatus did not pass through and another image-capturing apparatus captured images.

Furthermore, in the present embodiment, where a plurality of image data having image-capturing locations close to each other among the image data in the non-image-capturing locations, the image data having the image-capturing apparatus model name of the highest priority is selected and determined to be transfer object image data. Consequently, the image data having similar content can be prevented from being retrieved repeatedly, enabling to attain storage space reduction.

Third Embodiment

A PC that functions as an image data management apparatus according to a third embodiment, and still image data, which is processing object image data, each have a configuration that is similar to that in the first embodiment and thus has been described above.

Overview of Operation of the Entire Program

In the third embodiment, a non-image-capturing section, for which images were not captured, on a movement route of a specific image-capturing apparatus is calculated, and a location having a distance within a predetermined value from the non-image-capturing section is determined to be a non-image-capturing location.

In the third embodiment, image-capturing direction information for image data is further used to retrieve transfer object image data.

An overview of operation of the entire program in the third embodiment will be described using the flowchart in FIG. 2. The third embodiment is different from the first embodiment in the details of operation in the data list making processing (flowchart in FIG. 2: S201), the non-image-capturing location determination processing (flowchart in FIG. 2: S204), and transfer object image data retrieval processing (flowchart in FIG. 2: S205). The details of the respective processing will be described later.

Data List Making Processing

Figure 12:
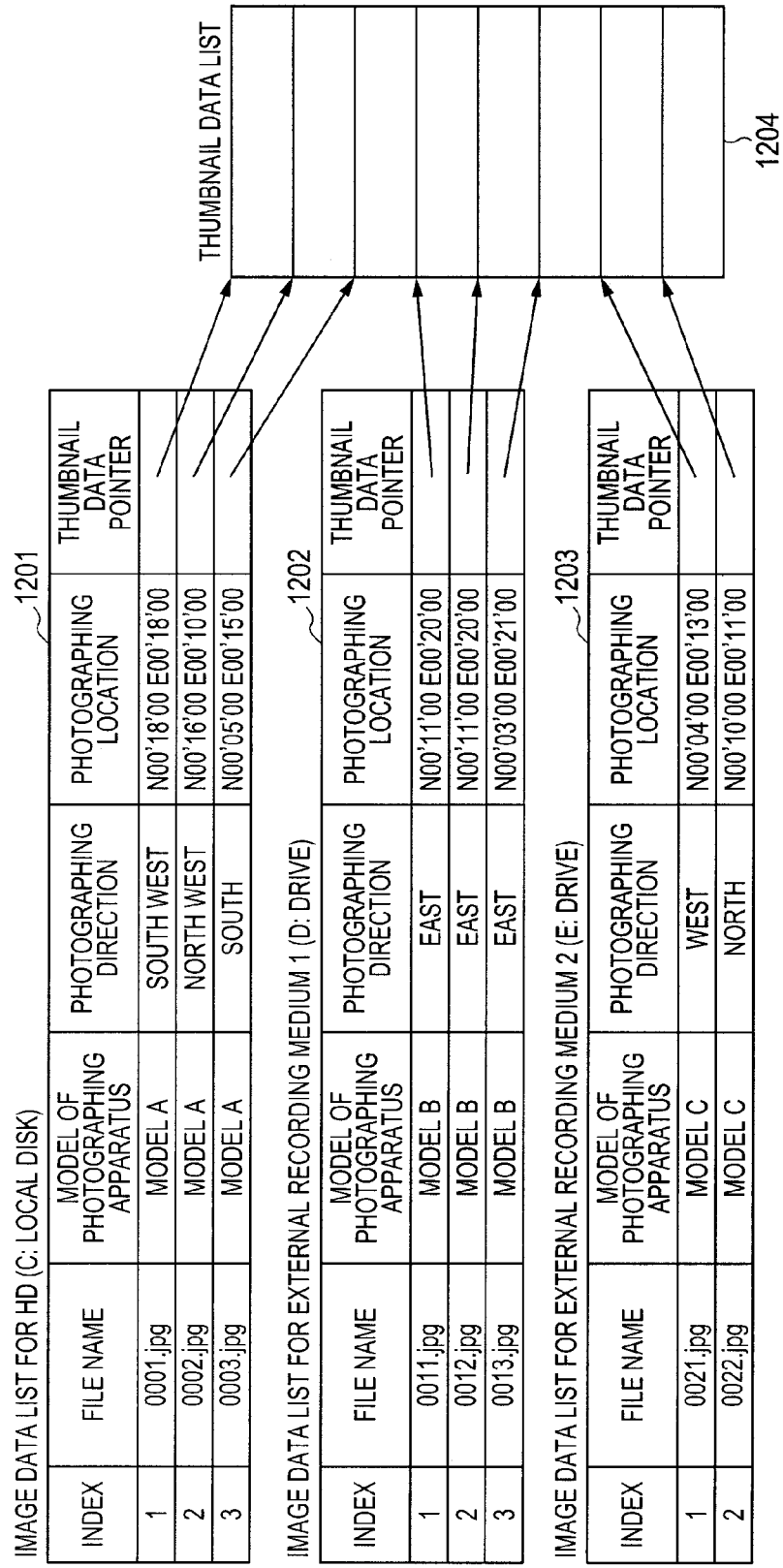
FIG. 12 is a diagram illustrating image data lists and a thumbnail data list, which are handled by an image data management apparatus according to a third embodiment.

In step S201, the CPU 101 reads image data to be used in an image data management apparatus from an HD 102 or external recording media 108. Then, the CPU 101 makes image data lists 1201 to 1203 and a thumbnail data list 1204 like those illustrated in FIG. 12 and stores the image data lists 1201 to 1203 and the thumbnail data list 1204 in a memory 103. The image data lists 1201 to 1203 and the thumbnail data list 1204 are used for screen display and data management in the image data management apparatus.

The image data lists 1201 to 1203 each include six categories: index, file name, image-capturing apparatus model name, image-capturing direction, image-capturing location and thumbnail data pointer. The image data list 1201 is a list of image data stored in the HD 102. The image data lists 1202 and 1203 are lists of image data that can be read from external recording media 108 via a D: drive 106 or an E: drive 112. In each of the image data lists 1201 to 1203, the image data are sorted in chronological order based on the image-capturing dates and times. The thumbnails stored in the thumbnail data list 1204 are reduced image information of the still image data.

Non-Image-Capturing Location Determination Processing

Figure 13:
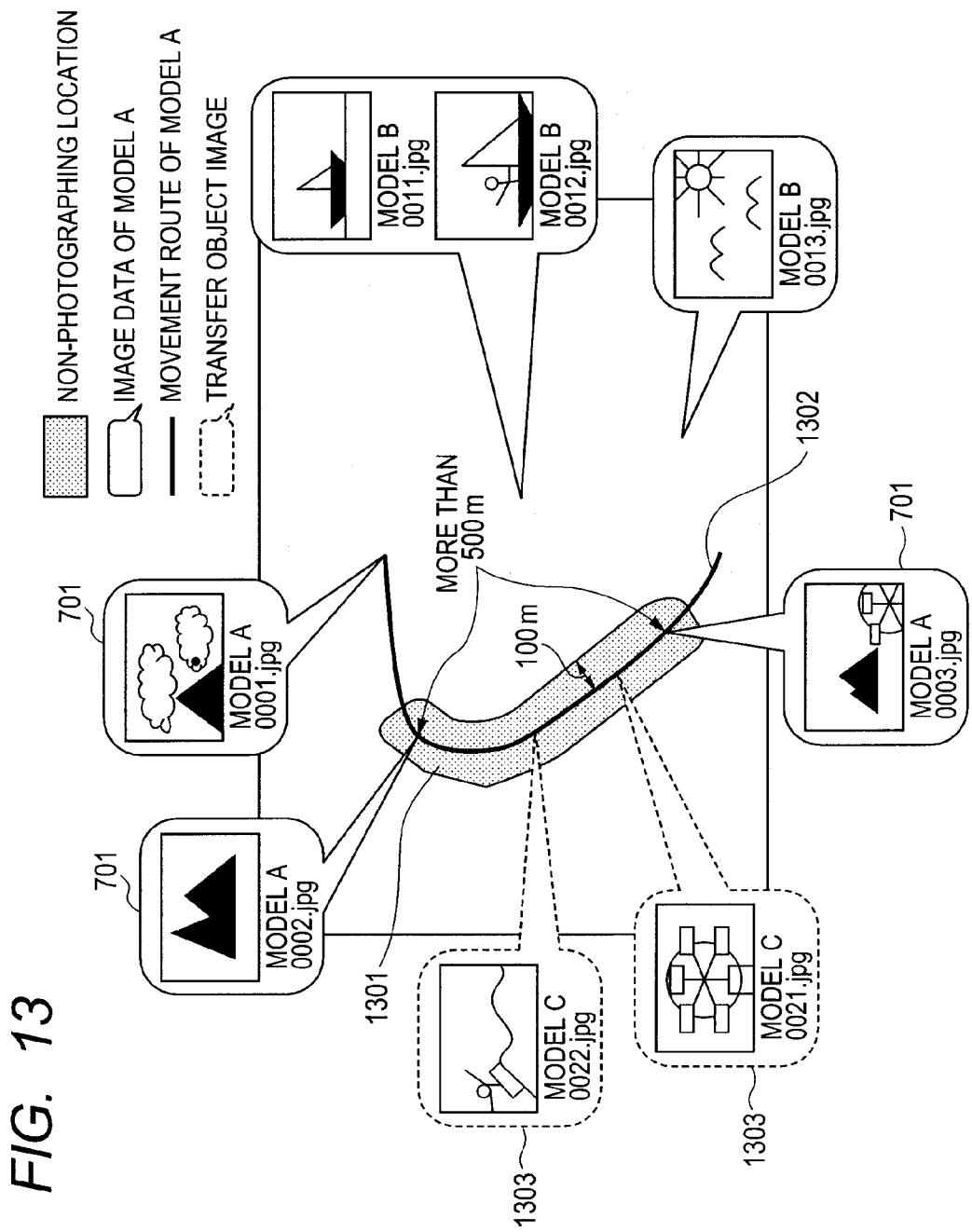
FIG. 13 is a diagram illustrating non-image-capturing location determination processing in an image data management apparatus according to a third embodiment.
Figure 14:
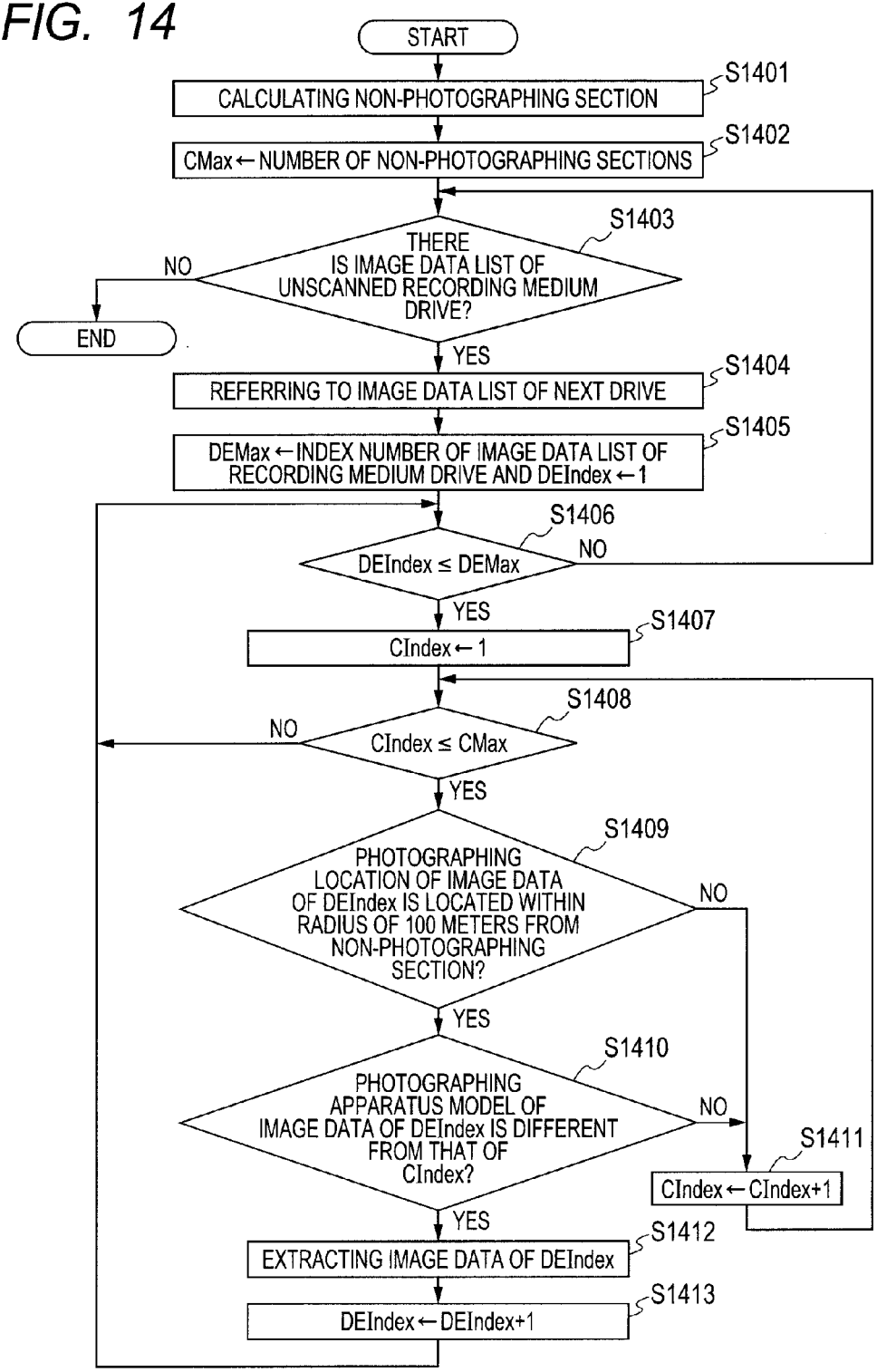
FIG. 14 is a flowchart illustrating non-image-capturing location determination processing in an image data management apparatus according to a third embodiment.

Next, the details of non-image-capturing location determination processing in step S204 in FIG. 2 will be described using the map in FIG. 13 and the flowchart in FIG. 14. FIG. 13 illustrates an example of indicating image-capturing location information of each image data on a map. The content, image-capturing apparatus model name and file name of image data are indicated in each balloon, and the destinations that the balloons designate indicate the image-capturing locations of the respective image data. Bold line balloons 701 indicate image data whose image-capturing capturing apparatus model names are a model A. a solid line 1302 is a movement route of an image-capturing apparatus of the model A. On the movement route 1302 of the model A, a section where the distance between image-capturing locations of the image data of the model A is no less than 500 m is determined to be a non-image-capturing section. In this non-image-capturing section (area 1301), locations within a radius of 100 meters from the movement route 1302 are determined to be non-image-capturing locations for the model A. Image data captured in the non-image-capturing locations and having image-capturing apparatus model names that are not the model A (image data in dotted-line balloons 1303) are extracted.

The above processing will be described using the flowchart in FIG. 14. In step S1401, the CPU 101 calculates a non-image-capturing section from the route and the image-capturing locations in the image data in the HD 102, and makes a non-image-capturing section data list 1501 and non-image-capturing section data 1502 as illustrated in FIG. 15. The non-image-capturing section data list 1501 includes index, image-capturing apparatus model name and non-image-capturing section data pointer. The route is divided by the image-capturing locations of the model A, and the length of each section is calculated, and where the calculated length is no less than 500 m, the section is stored as non-image-capturing section data 1502.

In step S1402, the CPU 101 stores the number of indexes in the non-image-capturing section data list 1501 made in step S1401 in CMax.

In step S1403, the CPU 101 determines whether or not there is an image data list for an unscanned recording medium drive. If there is an unscanned image data list (step S1403: YES), the CPU 101 advances the process to step S1404. If there is not (step S1403: NO), the CPU 101 terminates the non-image-capturing location determination processing.

In step S1404, the CPU 101 refers to the image data list for the unscanned recording medium drive. In step S1405, the CPU 101 stores the number of indexes in the image data list for the recording medium drive that is being scanned in DEMax, and 1 (initial value) in DEIndex indicating a referred index value.

In step S1406, the CPU 101 determines whether or not the DEIndex is not more than DEMax. If DEIndex is not more than DEMax (step S1406: YES), the CPU 101 advances the process to step S1407. If it is not (step S1406: NO), the CPU 101 advances the process to step S1403.

In step S1407, the CPU 101 stores 1 (initial value) in CIndex indicating a referred index value. In step S1408, the CPU 101 determines whether or not CIndex is not more than CMax. If CIndex is not more than CMax (step S1408: YES), the CPU 101 advances the process to step S1409. If it is not (S1408: NO), the CPU 101 advances the process to step S1406.

In step S1409, the CPU 101 determines whether or not the image-capturing location of the image data indicated by the DEIndex is a radius of no less than 100 meters away from that of the section data indicated by CIndex. If the image-capturing location is a radius of no less than 100 meters away (step S1409: YES), the CPU 101 advances the process to step S1410. If it is not (step S1409: NO), the CPU 101 advances the process to step S1411. Here, a location where the image-capturing location of the image data indicated by DEIndex has a distance of a radius of no less than 100 meters from the section data indicated by CIndex is a non-image-capturing location, and conversely, a location having a distance of a radius of less than 100 meters falls within the image-capturing range.

In step S1410, the CPU 101 determines whether or not the image-capturing apparatus model name of the image data indicated by DEIndex is different from the image-capturing apparatus model name indicated by CIndex. If the image-capturing apparatus model name is different (step S1410: YES), the CPU 101 advances the process to step S1412. If it is not (step S1410: NO), the CPU 101 advances the process to step S1411.

In step S1411, the CPU 101 increments the value of CIndex by one.

In step S1412, the CPU 101 stores the image data indicated by DEIndex as the extraction result. In step S1413, the CPU 101 increments the value of the DEIndex by one. The above is the operation flow of the non-image-capturing location determination processing. Using the image data lists 1201, 1202 and 1203 in FIG. 12, transfer object image data in the above-described non-image-capturing location determination processing are "0021.jpg" and "0022.jpg" in the E: drive 112.

Transfer Object Image Data Retrieval Processing

Next, the retrieval processing in step S205 will be described. In the retrieval processing in the present embodiment, where there is a plurality of image data whose image-capturing directions overlapping with each other from among the image data extracted in step S204, the CPU 101 further selects image data based on the image-capturing apparatus model names, and retrieves the image data as transfer object image data. More specifically, the CPU 101 calculates the distance of the image-capturing location of the plurality of image data extracted in step S204, and if there are image data captured within a certain range (for example, 100 m) and having the same image-capturing direction, the CPU 101 obtains their respective image-capturing apparatus model names. Then, the CPU 101 selects image data having the image-capturing apparatus model name of the highest priority and determines the image data to be transfer object image data. The priority is set in advance by image-capturing apparatus model name, and an image-capturing apparatus with higher-level specifications (such as the capability of capturing high-resolution image data) may be provided with a higher priority, or a user may designate the priority order.

Although the present embodiment has been described in terms of the case where a non-image-capturing section is determined, instead, a location where the distance between image data on a movement route of a specific image-capturing apparatus is within a predetermined value may be determined to be an image-captured section. In this case, image data captured by another image-capturing apparatus for an image-capturing location not included in the image-captured section may be extracted.

In the present embodiment, a movement route and image-capturing locations of a specific image-capturing apparatus are used for non-image-capturing location determination, enabling easy extraction of image data captured by another image-capturing apparatus in a section where the specific image-capturing apparatus did not take images on the route of the specific image-capturing apparatus.

Furthermore, in the present embodiment, where there is a plurality of image data having image-capturing locations close to each other and captured in the same direction among the image data for the non-image-capturing location, image data having the image-capturing apparatus model name of the highest priority is selected and determined as transfer object image data. Consequently, the image data having similar content can be prevented from being retrieved repeatedly, enabling to attain storage space reduction.

In the above-described embodiment, using image-capturing apparatus model names as identification information to uniquely identify the image-capturing apparatuses, image data captured by the respective image-capturing apparatuses are sorted out to determine non-image-capturing locations for a specific image-capturing apparatus (model A). However, other identification information relating to image-capturing apparatuses may be used. Examples of the other identification information may include identification information of recording mediums inserted into the image-capturing apparatuses and recording image data, image data storage location information, image-capturing apparatus owner information and arbitrary identification information provided by the image-capturing apparatus owners.

Other Embodiments

Furthermore, the present invention may also be put into practice by executing the following processing. In other words, software (program code) providing the functions of the above-described embodiments, is supplied to a system or an apparatus via a network or a recording medium of various types, and a computer (or, e.g., a CPU or MPU) in the system or apparatus reads the program to execute the program.

In this case, the program code itself read from the recording medium provides the functions of the above-described embodiments, and thus, the recording medium with the program code stored therein provides the present invention. For supplying a recording medium for providing such program code, for example, a floppy (registered trademark) disk, a hard disk, an optical disk, or a magneto optical disk may be used. Otherwise, a CD-ROM, a CD-R, a magnetic tape, a non-volatile memory card, a ROM or the like can also be used.

Furthermore, although the above-described embodiment has been described in terms of an example in which the present invention is applied to a PC, the present invention is not limited to this example. In other words, the present invention may be applied to an apparatus having a basic configuration illustrated in FIG. 1, which includes a processing unit that can execute an image management program, a memory, a display, and an input/output unit, for example, a digital camera or information terminal.

Each of the above-described embodiments is a mere specific example of putting the present invention into practice, and the technical scope of the present invention should not be limitedly construed by such embodiments. In other words, the present invention may be practiced in various alternate forms without departing from the technical scope or main features of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-234453, filed Oct. 8, 2009, which is hereby incorporated by reference herein in its entirety.

What is claimed is:

1. An image data management apparatus for managing a plurality of image data, comprising:

a reading unit configured to read identification information unique to an image-capturing apparatus which captured the image data, and image-capturing location information indicating an image-capturing location of the image data, the identification information and the image-capturing location information being related to the image data;

a determination unit configured to determine a non-image-capturing location for an image-capturing apparatus corresponding to specific identification information on the basis of the image-capturing location information of image data related to the specific identification information; and an extraction unit configured to extract, from among image data related to other identification information that is different from the specific identification information, image data whose image-capturing locations exists in the non-image-capturing location.

2. The image data management apparatus according to claim 1, wherein the reading unit further reads image-capturing date and time information indicating image-capturing date and time related to each image data; and wherein the image data management apparatus further comprises a date and time-based retrieval unit configured to retrieve image data on the basis of the image-capturing date and time of the image data related to the specific identification information from among the image data extracted by the extraction unit.

3. The image data management apparatus according to claim 1, further comprising:

a calculation unit configured to calculate a distance between the image-capturing locations of the image data extracted by the extraction unit;

a model retrieval unit configured to retrieve, from among a plurality of image data having the calculated distances smaller than a predetermined value, image data on the basis of a model name of an image-capturing apparatus corresponding to the other identification information.

4. The image data management apparatus according to claim 1, wherein the reading unit further reads image-capturing direction information related to each image data; and wherein the image data management apparatus further comprises:

an obtainment unit configured to obtain the image-capturing directions of the image data extracted by the extraction unit; and a direction retrieval unit configured to retrieve image data from among a plurality of image data having the same obtained image-capturing directions the image data extracted by the extraction unit, on the basis of the model name of the image-capturing apparatus corresponding to the other identification information.

5. The image data management apparatus according to claim 1, wherein the determination unit determines a location whose distance from the image-capturing location of the image data related to the specific identification information is no less than a predetermined value to be a non-image-capturing location.

6. The image data management apparatus according to claim 1, wherein the determination unit divides a retrieval object area into a plurality of small areas, and determines a small area not including the image-capturing location of the image data related to the specific identification information to be a non-image-capturing location.

7. The image data management apparatus according to claim 1, further comprising a route making unit configured to make a route on the basis of the image-capturing location of the image data related to the specific identification information,
   wherein the determination unit determines a location whose distance from the route is no less than a predetermined value, to be a non-image-capturing location.

8. The image data management apparatus according to claim 1, further comprising a route making unit configured to make a route on the basis of the image-capturing location of the image data related to the specific identification information,
   wherein the determination unit determines a section whose distance on the route from the image-capturing location of the image data related to the specific identification information is no less than a predetermined value, to be a non-image-capturing section, and determines a location having a distance within a predetermined value from the non-image-capturing section to be a non-image-capturing location.

9. An image data management method for managing a plurality of image data, comprising the steps of:
   reading identification information unique to an image-capturing apparatus which captured the image data, and image-capturing location information indicating an image-capturing location of the image data, the identification information and the image-capturing location information being related to the image data;
   determining a non-image-capturing location for an image-capturing apparatus corresponding to specific identification information on the basis of the image-capturing location information of image data related to the specific identification information; and
   extracting, from among image data related to other identification information that is different from the specific identification information, image data whose image-capturing location exists in the non-image-capturing location.

10. A computer program stored on a non-transitory computer-readable recording medium, comprising program code for causing a computer to execute management processing of a plurality of image data, the management processing comprising:
   reading identification information unique to an image-capturing apparatus which captured the image data, and image-capturing location information indicating an image-capturing location of the image data, the identification information and the image-capturing location information being related to the image data;
   determining a non-image-capturing location for an image-capturing apparatus corresponding to specific identification information on the basis of the image-capturing location information of image data related to the specific identification information; and
   extracting, from among image data related to other identification information that is different from the specific identification information, image data whose image-capturing location exists in the non-image-capturing location.

11. An image data management apparatus for managing a plurality of image data, comprising:
   a reading unit configured to read identification information unique to an image-capturing apparatus which captured the image data, and image-capturing location information indicating an image-capturing location of the image data, the identification information and the image-capturing location information being related to the image data;
   a determination unit configured to determine an image-capturing area for an image-capturing apparatus corresponding to specific identification information on the basis of the image-capturing location information of image data related to the specific identification information; and
   an extraction unit configured to extract, from among image data related to other identification information that is different from the specific identification information, image data whose image-capturing location does not exist in the image-capturing area.

\* \* \* \* \*